US012810460B2

(12) United States Patent
Green et al.

(10) Patent No.: US 12,810,460 B2
(45) Date of Patent: Nov. 24, 2026

(54) DATA PROCESSING APPARATUS AND METHOD

(71) Applicants: Sony Group Corporation, Tokyo (JP); Sony Europe B.V., Surrey (GB)

(72) Inventors: Samuel Green, Basingstoke (GB); Joe Taylor, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 266 days.

(21) Appl. No.: 18/230,629

(22) Filed: Aug. 5, 2023

(65) Prior Publication Data

US 2024/0062407 A1 Feb. 22, 2024

(30) Foreign Application Priority Data

Aug. 19, 2022 (GB) ...................................... 2212135

(51) Int. Cl.
*G06K 9/00* (2022.01)
*G06T 7/20* (2017.01)
*G06T 7/70* (2017.01)

(52) U.S. Cl.
CPC .................. *G06T 7/70* (2017.01); *G06T 7/20* (2013.01); *G06T 2207/20076* (2013.01); *G06T 2207/30196* (2013.01); *G06T 2207/30221* (2013.01); *G06T 2207/30241* (2013.01)

(58) Field of Classification Search
CPC . G06T 2207/20076; G06T 2207/30196; G06T 2207/30221; G06T 2207/30241; G06T 7/20; G06T 7/70; G06V 40/103
See application file for complete search history.

(56) References Cited

U.S. PATENT DOCUMENTS

| | | | | |
|---|---|---|---|---|
| 9,600,717 | B1 * | 3/2017 | Dai | G06V 40/20 |
| 9,636,550 | B2 * | 5/2017 | Thurman | A63B 43/004 |
| 2011/0268320 | A1 | 11/2011 | Huang | |
| 2018/0032858 | A1 * | 2/2018 | Lucey | G06N 3/08 |

(Continued)

FOREIGN PATENT DOCUMENTS

| | | | |
|---|---|---|---|
| KR | 20220096335 | A | 7/2022 |
| WO | 2017210564 | A1 | 12/2017 |

OTHER PUBLICATIONS

Xinguo Yu et al: "Team possession analysis for broadcast soccer video based on ball trajectory", Information, Communications and Signal Processing, 2003 and Fourth Pac ific Rim Conference on Multimedia. Proceedings of the 2003 Joint Conference of the Fourth International Conference on Singapore Dec. 15-18, 2003, Piscataway, NJ, USA, IEEE, vol. 3, Dec. 15, 2003 (Dec. 15, 2003), pp. 1811-1815, XP010702986, DOI: 10.1109/ICICS.2003.1292779 ISBN: 978-0-7803-8185-8.

(Continued)

*Primary Examiner* — Hadi Akhavannik
(74) *Attorney, Agent, or Firm* — Tucker Ellis LLP

(57) ABSTRACT

A data processing apparatus includes circuitry configured to: obtain an image of a person participating in a sport; determine, using the image, pose information indicative of a pose of the person; determine, using historical information indicative of a relationship between the determined pose information and a probability of an occurrence of an event of the sport, a probability of the occurrence of the event of the sport; and output the determined probability of the occurrence of the event of the sport.

19 Claims, 14 Drawing Sheets

(56) References Cited

U.S. PATENT DOCUMENTS

| | | | | |
|---|---|---|---|---|
| 2018/0322337 | A1 | 11/2018 | Marty | |
| 2019/0141820 | A1* | 5/2019 | Donners | H05B 47/175 |
| 2019/0224556 | A1* | 7/2019 | Ruiz | A63B 71/0622 |
| 2019/0329114 | A1* | 10/2019 | Marty | A63B 69/0071 |
| 2020/0023235 | A1* | 1/2020 | Hermansen | A61B 5/1122 |
| 2020/0276474 | A1* | 9/2020 | Power | A63B 24/0006 |
| 2020/0298080 | A1* | 9/2020 | Zhang | G06N 3/045 |
| 2021/0192783 | A1* | 6/2021 | Huelsdunk | G06T 7/75 |
| 2022/0230079 | A1* | 7/2022 | Tekín | G06N 3/09 |

OTHER PUBLICATIONS

Search Report from corresponding GB Application No. 2212135.4, Feb. 21, 2023, 4 pages.

* cited by examiner

600

| Player position (m) | Hip-shoulder angle, az (°) | Hip-shoulder angle, pol (°) | Backlift (m) | Ball position (m) | Ball-to-goal Distance (m) | Ball velocity ($ms^{-1}$) | Trajectory angle (°) | Goal coverage (%) | Likelihood of goal (%) |
|---|---|---|---|---|---|---|---|---|---|
| (5.3, 10.4, 0.8) | 5.6 | 10.6 | 0.56 | (5.6, 10.7, 0.1) | 25.1 | (0.5, 1.3, 0.7) | 12.1 | 55 | 31 |
| (-4.5, 2.9, 0.9) | 11.1 | 3.2 | 0.31 | (-4.6, 3.3, 0.1) | 6.4 | (20.3, 2.9, 1.0) | 20.4 | 43 | 57 |
| (14.2, -12.8, 1.0) | 6.4 | 5.7 | 0.65 | (14.4, -11.9, 1.2) | 11.3 | (15.2, 1.3, 1.7) | 5.2 | 67 | 23 |
| (-10.7, 7.4, 0.8) | 2.1 | 9.1 | 0.22 | (-10.1, 8.1, 0.8) | 17.4 | (0.3, -0.7, 0.1) | 10.5 | 21 | 78 |

FIG. 6

800

| Player position (m) | Relative ball position (m) | Minimum receiver distance (m) | Hip-shoulder angle, az (°) | Hip-shoulder angle, pol (°) | Backlift (m) | Time with the ball (s) | Relative ball speed ($ms^{-1}$) | Likelihood of pass (%) |
|---|---|---|---|---|---|---|---|---|
| (5.3, 10.4, 0.8) | (5.6, 10.7, 0.1) | 10.2 | 5.6 | 10.6 | 0.56 | 0.56 | 0.6 | 31 |
| (-4.5, 2.9, 0.9) | (-4.6, 3.3, 0.1) | 6.4 | 11.1 | 3.2 | 0.31 | 1.25 | 1.7 | 57 |
| (14.2, -12.8, 1.0) | (14.4, -11.9, 1.2) | 12.7 | 6.4 | 5.7 | 0.65 | 2.74 | 0.2 | 23 |
| (-10.7, 7.4, 0.8) | (-10.1, 8.1, 0.8) | 9.2 | 2.1 | 9.1 | 0.22 | 0.93 | 1.1 | 78 |

FIG. 8

1100

| Player position (m) | Hip-shoulder angle, az (°) | Hip-shoulder angle, pol (°) | Backlift (m) | Ball position (m) | Ball-to-goal Distance (m) | Ball velocity ($ms^{-1}$) | Predicted trajectory angle (°) | Goal coverage (%) | Event |
|---|---|---|---|---|---|---|---|---|---|
| (5.3, 10.4, 0.8) | 5.6 | 10.6 | 0.56 | (5.6, 10.7, 0.1) | 25.1 | (-0.5, 1.3, 0.7) | 12.1 | 55 | shot |
| (-4.5, 2.9, 0.9) | 11.1 | 3.2 | 0.31 | (-4.6, 3.3, 0.1) | 6.4 | (20.3, 2.9, 1.0) | 20.4 | 43 | pass |
| (14.2, -12.8, 1.0) | 6.4 | 5.7 | 0.65 | (14.4, -11.9, 1.2) | 11.3 | (15.2, 1.3, 1.7) | 5.2 | 67 | shot |
| (-10.7, 7.4, 0.8) | 2.1 | 9.1 | 0.22 | (-10.1, 8.1, 0.8) | 17.4 | (0.3, -0.7, 0.1) | 10.5 | 21 | shot |

FIG. 11

DATA PROCESSING APPARATUS AND METHOD

CROSS REFERENCE TO RELATED APPLICATIONS

The present application claims priority to United Kingdom Patent Application No. 2212135.4, filed Aug. 19, 2022, the content of which is incorporated herein by reference in its entirety.

BACKGROUND

Field of the Disclosure

The present disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Object tracking technology is often employed during sports (that is, sporting events) to track the position of objects in the events, such as the sports players. This allows information to be collected that indicates player movement, for example, which can then be used for various purposes such as live commentary, post-game analysis of player technique, or the like.

One application of such technology is in calculating the likelihood of a certain event, such as a player goal, occurring at a particular time. However, there is a desire to increase accuracy of existing models.

SUMMARY

The present disclosure is defined by the claims.

BRIEF DESCRIPTION OF THE DRAWINGS

Non-limiting examples and advantages of the present disclosure will be best understood by reference to the following detailed description taken in conjunction with the accompanying drawings, wherein:

FIG. 6 is a table 600 showing a number of parameters that are taken into account when training a machine learning model

FIG. 8 is a table 800 showing a number of parameters that are taken into account when training a machine learning model

FIG. 11 is a table 1100 showing a number of parameters that are taken into account when training a machine learning model

Like reference numerals designate identical or corresponding parts throughout the drawings.

DETAILED DESCRIPTION OF THE EMBODIMENTS

Figure 1:
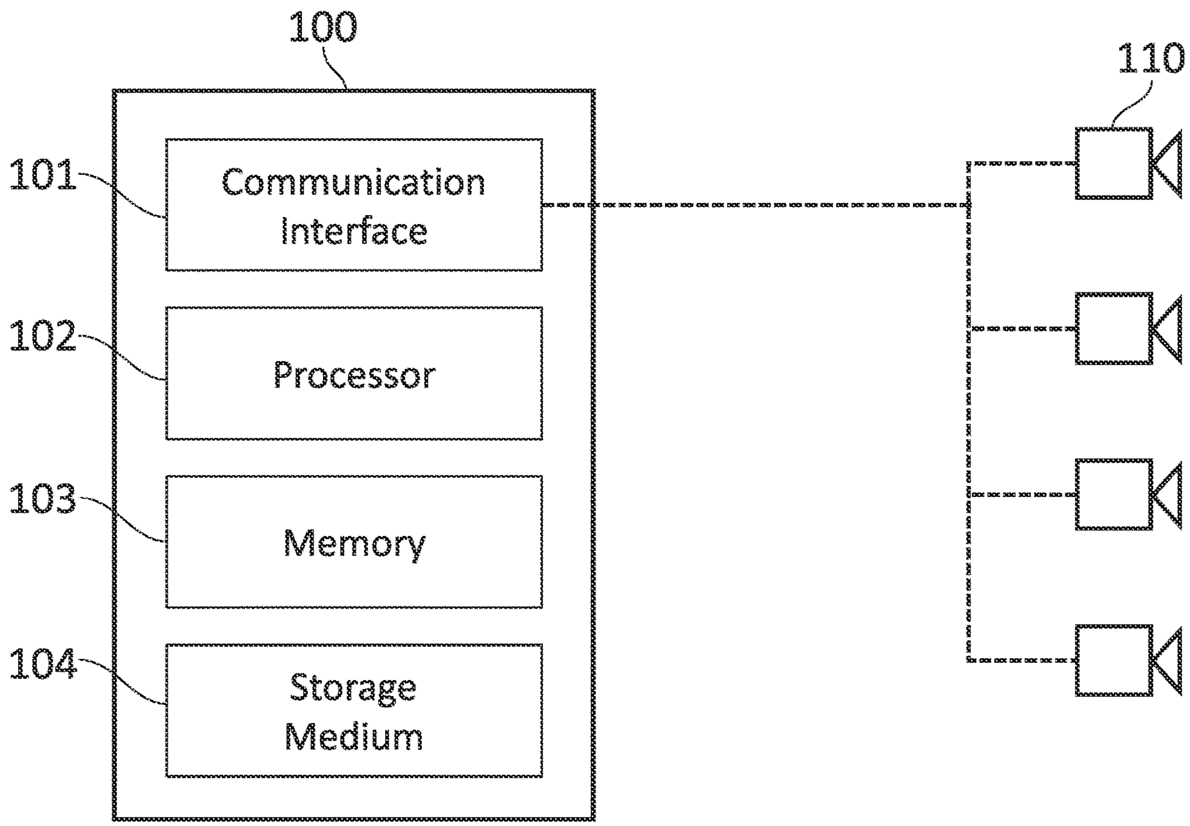
FIG. 1 shows an information processing device 100 and a camera system 110.

FIG. 1 shows an information processing device 100 and a camera system 110. The information processing device 100 comprises a communication interface 101 for sending electronic information to and/or receiving electronic information from one or more of other information processing devices (including cameras of the camera system 110, for example), a processor 102 for processing electronic instructions, a memory 103 for storing the electronic instructions to be processed and input and output data associated with the electronic instructions and a storage medium 104 (e.g. in the form of a hard disk drive, solid state drive, tape drive or the like) for long term storage of electronic information. Each of the communication interface 101, processor 102, memory 103 and storage medium 104 are implemented using appropriate circuitry, for example. The circuitry may be embodied as solid state circuitry which may be controlled by software or may be an Application Specific Integrated Circuit. The software comprises computer readable instructions, which when loaded onto a computer or circuitry, configures the computer (or circuitry) to perform a method according to examples. The software is stored on the storage medium 204. The processor 102 controls the operation of each of the communication interface 101, memory 103 and storage medium 104.

The camera system 110 may be, for example, a system provided by Hawk-Eye® Innovations Ltd. The system comprises a plurality of cameras that are positioned at different locations surrounding a sporting event. Whilst FIG. 1 depicts four cameras in the camera system 110, the present disclosure is not limited in this regard and the plurality of cameras may include any suitable number of cameras. In FIG. 1 the camera system 110 is directly connected to the communication interface 101 of the information processing device 100. However, in other examples the camera system 110 is connected to the communication interface 101 via another device or devices, such as a routing device. The connection may be any suitable type of communication link known in the art (for example, a wireless or wired connection) through which electronic information can be transmitted.

Figure 2:
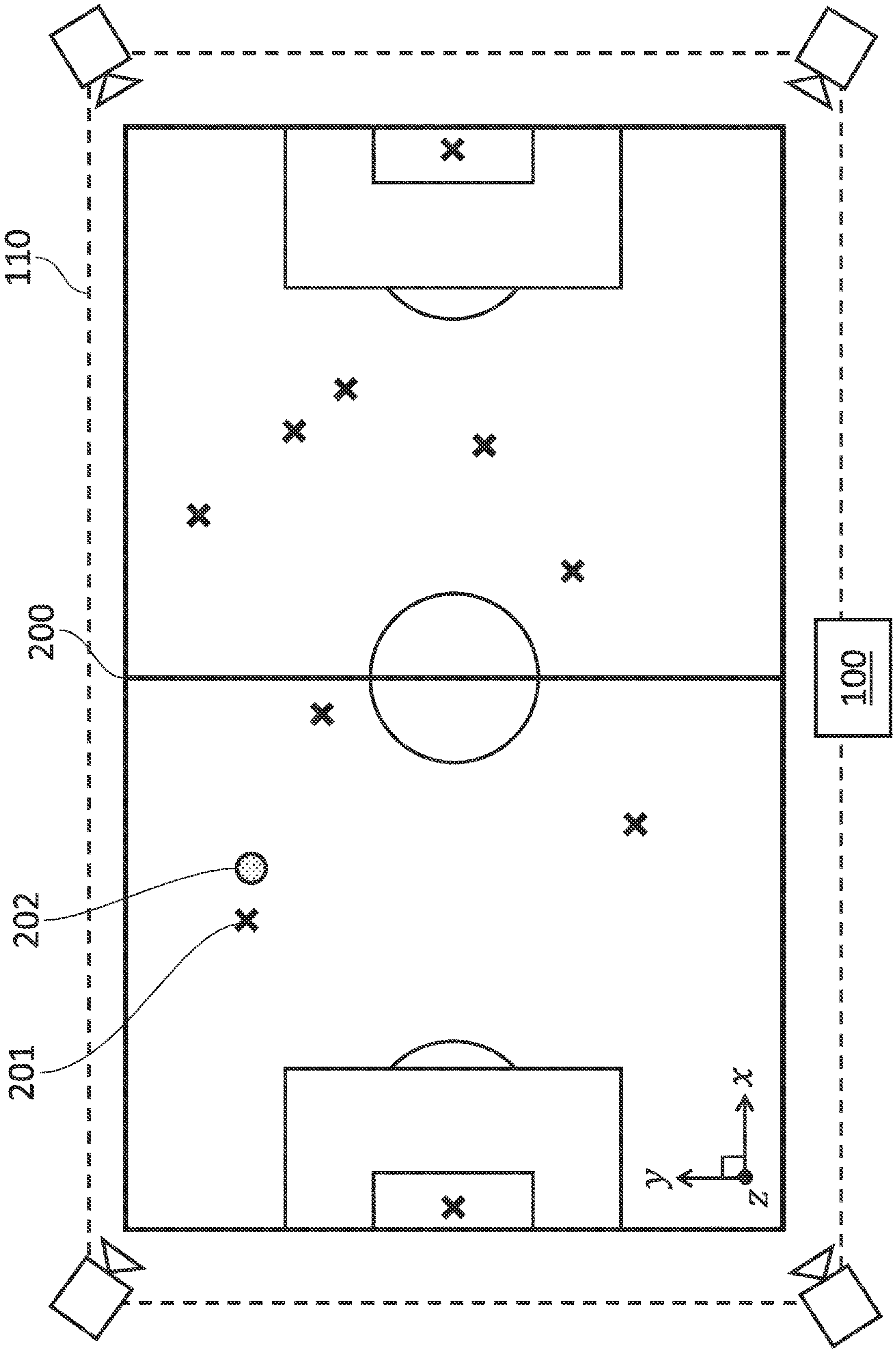
FIG. 2 depicts a football pitch 200 during a sporting event.

FIG. 2 depicts a football pitch 200 during a sporting event, where the sporting event is a football (that is, European football, i.e. soccer) match. Surrounding the pitch is the camera system 110 connected to the device 100. The plurality of cameras in the camera system 110 capture images of objects in the sporting event. In examples shown in FIG. 2, such objects include objects 201 and 202, which are a football player and a football respectively. In FIG. 2, objects on the football pitch 200 that are football players (such as object 201, hereafter referred to as player 201) are depicted by a cross, whilst object 202 (hereafter referred to as ball 202) is depicted by a circle. A coordinate system is indicated in the lower left-hand corner of the pitch 200, wherein the x-axis is parallel to the longitudinal direction along the length of the pitch and the y-axis is parallel to the direction along the width of the pitch. The z-axis is perpendicular to the x-y plane, in the vertical direction from the pitch. The use of this coordinate system will be assumed hereafter. However, the scope of the present disclosure is not limited in this regard and in further examples any suitable coordinate system may be used.

In other examples the sporting event may be any suitable sporting event, such as a tennis match, a cricket match or the like. The area within which the sporting event takes place may therefore be a tennis court, a cricket pitch or the like. An object in the sporting event may be any type of sporting projectile (e.g. a tennis ball, cricket ball or the like), a player participating in the sporting event (e.g. a tennis player, cricket player or the like), a person participating in the sporting event who is not a player (e.g. a referee) or any type of sports equipment or apparatus such as a tennis racket, cricket bat, goal post or the like. Note the term 'goal' may refer to either the goalposts (e.g. goalposts 300, defined by two vertical posts whose tops are joined by a further post, known as a crossbar, to define a rectangular goal area) between which a goal must pass in order for a point to be scored or the point itself. Thus, a player may score a 'goal' by kicking the ball between the posts of the 'goal'. The applicable interpretation will be clear in context.

During a sporting event such as a football match, it is often desirable to calculate the likelihood of a point being scored (for example, the likelihood of a goal occurring) at a particular time. One method of calculating this likelihood uses information indicating the approximate positions and/or velocities of certain objects in the sporting event. For example, during a football match a camera system such as camera system 110 may be used to capture images of objects on the football pitch from a plurality of different angles at approximately the same time. This may be achieved by time-syncing the cameras using any suitable method known in the art. The camera system 110 then sends image information corresponding to each image to a device such as information processing device 100. The device 100 performs image analysis for each image to identify the position of a certain object in the image, using any suitable object-recognition technique known in the art. The three-dimensional (3D) position of the object on the pitch is then determined from the position of the object in each image, the focal length of each camera used to capture each image, and the relative positions of the plurality of cameras around the pitch using any suitable techniques known in the art (so that, for example, a position of a particular object in one or more of concurrently captured images can be mapped to a corresponding 3D position on the pitch). Using this information, a centre-of-mass (CoM) model is created which indicates the positions of one or more objects on the pitch.

The relative positions of objects with respect to each other, and with respect to certain areas of the pitch (e.g. a goal area) may then be calculated. In addition, determining the position of an object on the pitch at known successive times (using images captured at successive times) is used to calculate the object's velocity. This allows an object's velocity at a particular point in time to be estimated based on its position in one or more images at known preceding times.

Using this information collected from previous sporting events, a machine learning model can be trained to associate the values of certain parameters and/or combinations of parameters with the likelihood of a point being scored. For example, a machine learning model can be trained on data from previous football matches to identify the correlation between past instances of goals with the relative positions and/or velocities of a player, the ball and the position of the goal area at a time when the player is about to attempt the shot. Based on this, the machine learning model is then able to estimate a likelihood of a goal using new values of the relative positions and/or velocities of a player, the ball and the position of the goal area at a particular point in time. Any suitable machine learning model may be used, including a suitable regression model such as linear regression, polynomial regression, support vector regression (SVR), decision tree regression or random forest regression, for example.

Figure 3:
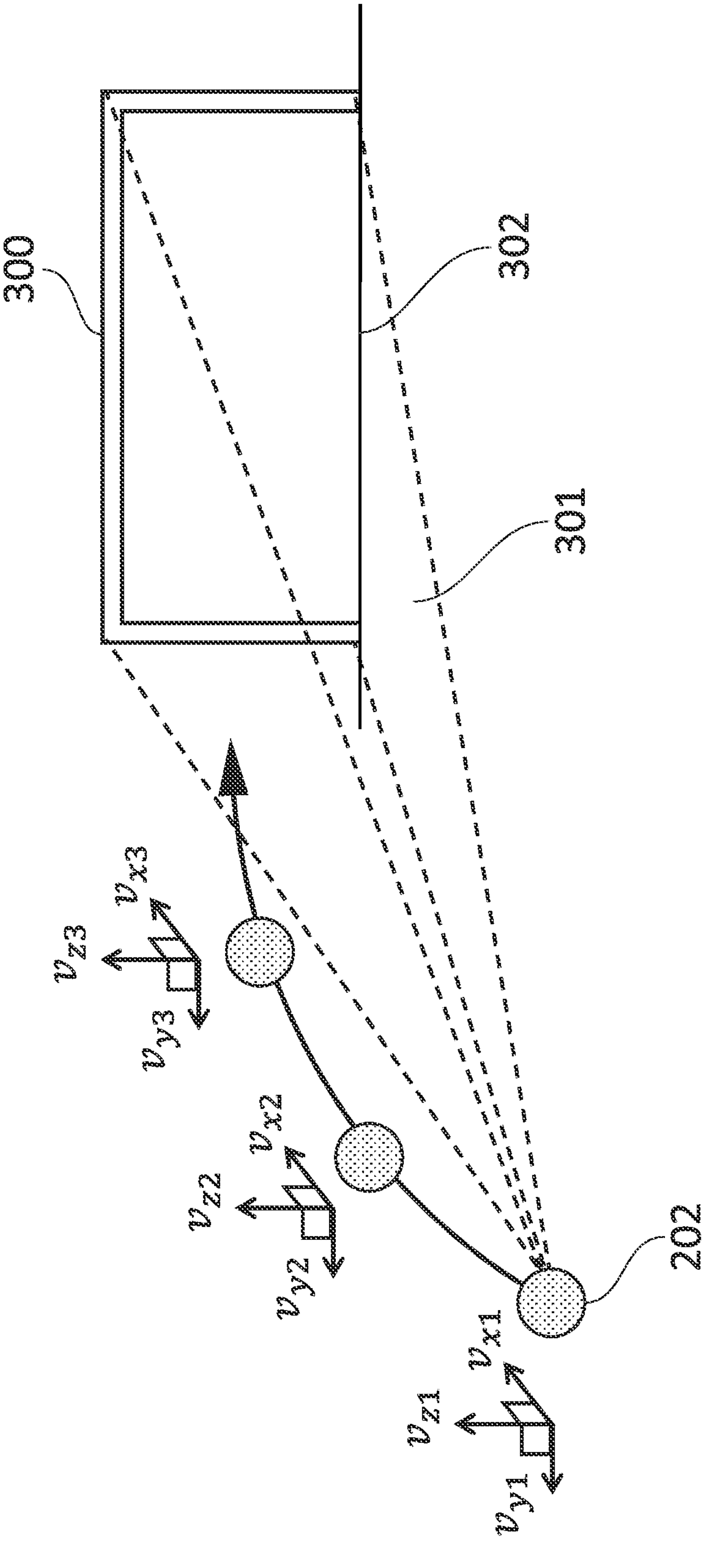
FIG. 3 depicts the ball 202 at three points in time during its trajectory towards the goal 300.

An example of relevant information that is correlated with the likelihood of successfully scoring the goal is the predicted trajectory of the ball 202. After the ball 202 is kicked by a player, the position of the ball on the pitch can be determined as described above at successive times, allowing the velocity of the ball to be calculated at each point in its trajectory. This is shown in FIG. 3, which depicts the ball 202 at three points in time during its trajectory towards the goal (goalposts) 300. For a given point in time, it is therefore possible to predict the remainder of the ball's path towards the goal when taking into account the influence of gravity and drag. In FIG. 3, the dashed lines show the angular width of the goal 300 from the position of the ball 202. This defines a 3D space 301 which the parabolic trajectory of the ball needs to enter by the time it reaches an edge 302 of the pitch defining the goal line in order for a goal to be scored. When data from past sporting events is considered, the predicted path of the ball is indicative of the likelihood of a successful goal. This is because in past sporting events there will be a higher number of successful goals in instances where, at a point in time when a player has just kicked the ball, velocity information (that is, speed and direction information) of the ball indicates a predicted ball trajectory that enters (or remains inside) the 3D space 301 when the ball reaches the edge of the pitch defining the goal line.

However, models that only take into account the approximate position and velocity of certain objects are often inaccurate because they do not account other relevant information about a scenario. For example, they cannot account for the manner in which a player attempts to score a point (e.g. the way a football player kicks the ball). Here, methods according to examples of the present disclosure are described which enable a more accurate calculation of the likelihood of a goal being scored.

Figure 4:
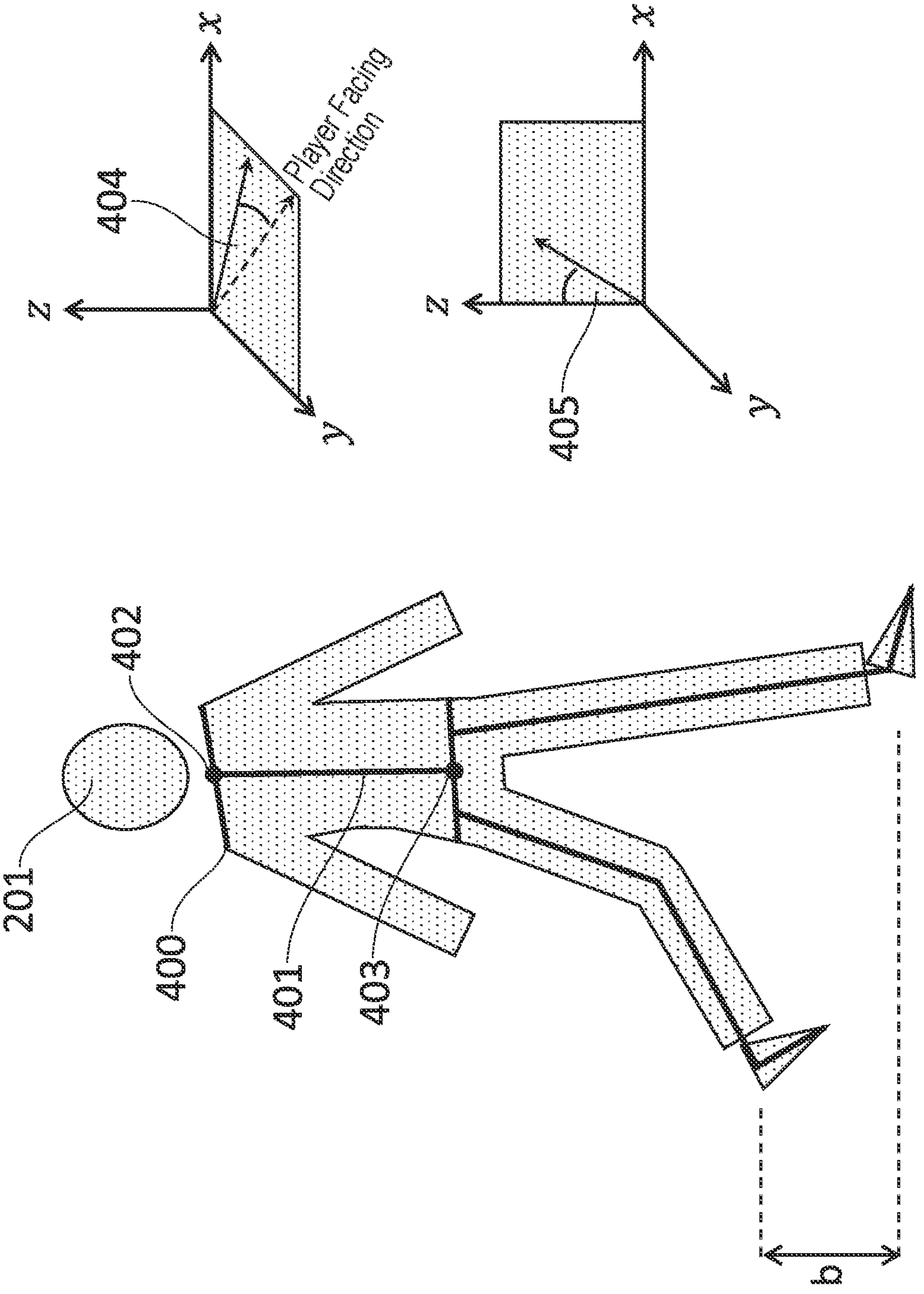
FIG. 4 shows a result of image processing on an image of the player 201.

FIG. 4 shows a result of image processing on an image of the player 201. The image was captured at a point in time when the player 201 was preparing to kick the ball 202 (not shown) towards a goal. The image processing is performed by the information processing device 100 for image information received from the camera system 110, as described above. Here, the image processing comprises object recognition that is able to identify a pose of the player 201, rather than merely their approximate position in the image. Any suitable known pose estimation technique may be used. For example, a pictorial structure framework (PSF) using nonlinear joint regression or a suitably trained convolutional neural network (CNN) may be used. A skeleton 400 is then mapped to the player 201, from which pose information relating to the player can be determined. For example, the relative position of the player's hips and shoulders can be determined from the orientation of the skeleton 400. In particular, the angle in the x-y plane between the line 401 from the player's mid-hip 403 to mid-shoulder 402 on the skeleton 400, relative to the direction the player is facing, hereafter referred to as the hip-shoulder azimuthal angle 404, can be determined. The angle between the z-axis and the line 401 from the player's mid-hip 403 to mid-shoulder 402, hereafter referred to as the hip-shoulder polar angle 405, can be determined in a similar way. These angles are indicated in FIG. 4.

Another parameter which is determined in examples is 'backlift', b, the amount in the z-direction by which the player 201 has raised their striking foot (the foot used to kick the ball) before kicking the ball. This is calculated by determining the maximum height above the ground that the ankle of the player's striking foot reaches during a time period immediately before kicking the ball. The present disclosure is not limited in this regard, however, and in further examples any suitable parameter relating to the pose of a player may be calculated from pose information. For example, the relative positions of a player's legs, hips and shoulders may be used to determine the direction in which the player is facing. In one example, the direction of a line perpendicularly bisecting the player's hips (e.g. at mid-hip 403) in the x-y plane relative to a predetermined angle (which defines 0°) defines the direction the player is facing. In another example, an average of the direction of each of the player's feet in the x-y plane relative to a predetermined angle (which defines 0°) defines the direction the player is facing (for instance, if the left foot is at 30° relative to the predetermined angle and the right foot is at 40° relative to the predetermined angle, then the direction of the player is determined to be 35° relative to the predetermined angle).

Such parameters related to a player's pose are indicative of the player's form when aiming to kick the ball into the goal, which is correlated with the likelihood of successfully scoring the goal. The manner in which a player kicks the ball (indicated by their pose) can be due to the skill of the player and also the situation in which the player is making the shot, both of which may affect the likelihood of a goal being scored. For example, certain values of the foot position and hip-shoulder angles may occur when a player is making a difficult shot with a lower chance of success, and therefore indicate a lower likelihood. In particular, values of the hip-shoulder azimuthal angle and hip-shoulder polar angle can indicate whether the player is off-balance. As another example, it may be determined that the player has a higher likelihood of scoring a goal if their initial pose is such that they are facing in a direction towards the goal, compared to a situation where they are facing in a direction away from the goal.

In examples where pose information relating to the player 201 is determined for images captured at successive points in time, additional parameters such as the velocity of the player's feet may be calculated. At a point in time when the player 201 is about to kick the ball 202 (such as depicted in FIG. 4), the velocity of the player's striking foot and the backlift b may be used to predict the trajectory of the ball 202. It is therefore possible to determine the predicted trajectory of the ball 202 at points in time before the ball 202 has been kicked, rather than only once the ball has already started its trajectory.

A machine learning model can therefore be trained to associate the values of these parameters with a likelihood of a point being scored using data collected from previous sporting events. For example, in past sporting events there will be a higher number of successful goals in instances where, at a point in time when a player is about to kick the ball, pose information related to the player indicates a predicted ball trajectory that is directed towards the goal.

Another example of relevant information that is indicative of the likelihood of a goal being scored is an amount by which the goal area is obscured when viewed from the position of the ball ('goal coverage'). This may be expressed as a percentage indicating the proportion of the goal area that is obscured when viewed from the position of the ball, wherein a higher percentage of the goal being obscured by other players is associated with a lower likelihood of a goal being scored at a particular time (since there are fewer routes the ball can take that would successfully land the ball in the goal area).

However, the present disclosure is not limited in this regard and in further examples the goal coverage is expressed in any suitable form that gives a measure of the amount by which the goal area is obscured. For instance, the amount by which the goal is obscured could be classed as 'High" (e.g. for 70% or more coverage), 'Medium' (e.g. for 30-69% coverage) or 'Low' (e.g. for 29% or less coverage). From a CoM model that shows the relative positions of the ball, the goal and other players on the pitch, a rough estimate of goal coverage based on the number of players positioned between the ball and the goal may be calculated. However, by determining the pose of the players the goal coverage can be calculated more accurately. This is exemplified from FIGS. 5A and 5B.

Figure 5A:
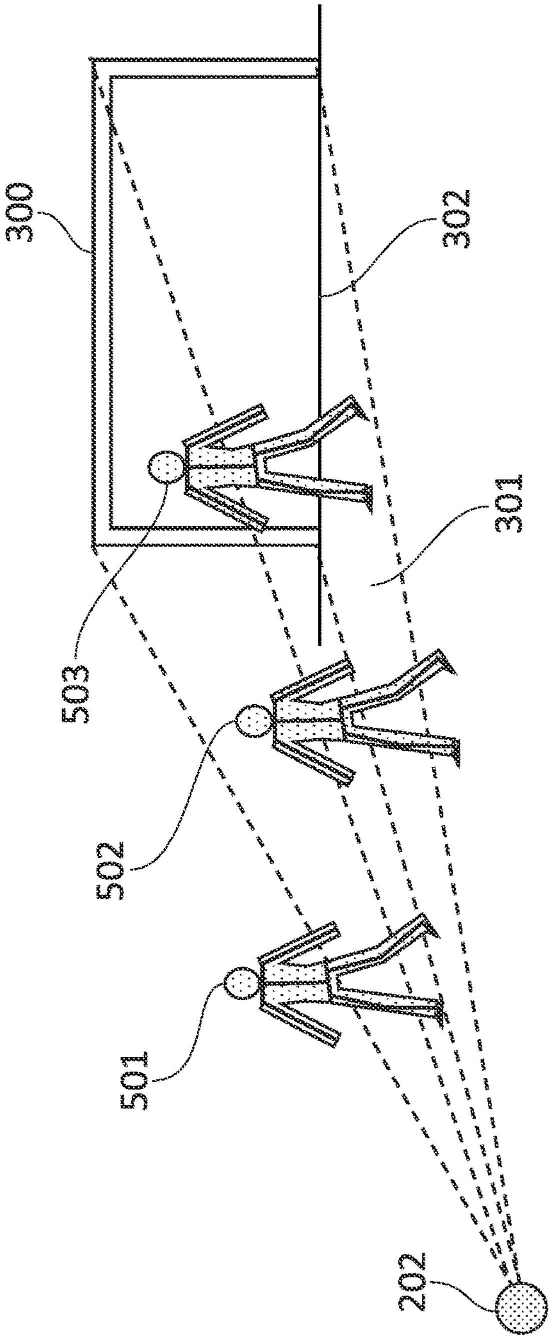
FIG. 5A shows the ball 202 positioned in front of the goal 300.

FIG. 5A shows the ball 202 positioned in front of the goal 300. The dashed lines define the 3D space 301 in a similar manner to the dashed lines in FIG. 3. Three players, 501-503, are positioned between the ball 202 and the goal 300 such that they partially obscure the goal 300 from the ball 202.

Figure 5B:
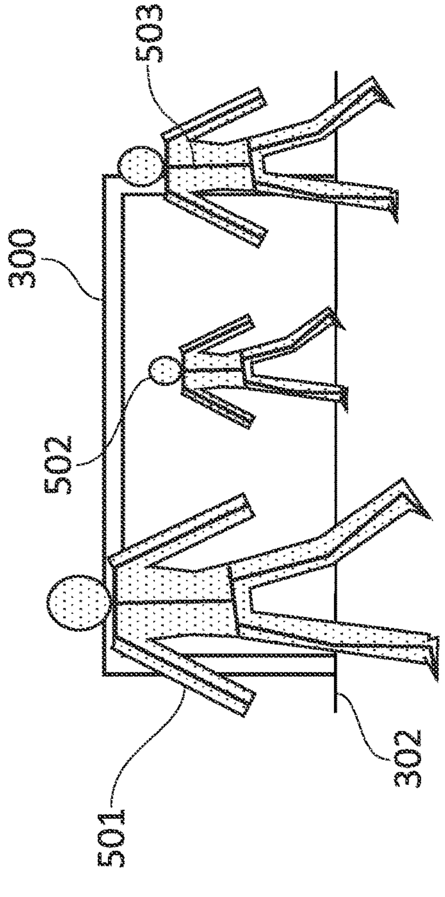
FIG. 5B shows the amount by which the goal 300 is obscured by the players 501-503 from the position of the ball 202.

FIG. 5B shows the amount by which the goal 300 is obscured by the players 501-503 from the position of the ball 202. If only a rough estimate of each player's coverage of the goal is known (e.g. based the position of each player's CoM), it would only be possible to calculate the goal coverage based on whether or not a player is positioned directly between the ball and the goal. It may be incorrectly assumed, for example, that player 503 does not obscure the goal by any amount if their CoM position falls outside of the goal boundary from the perspective of the ball. However, when the pose information of each player is determined the calculation of goal coverage can take into account partial coverage of the goal by e.g. the limbs of player 503. The goal coverage can therefore be calculated more accurately when the pose of the players is taken into account.

In further examples, the poses and relative positions of multiple players on the pitch are also used to calculate whether the ball is obscured when viewed from the position of the goalkeeper. For example, the goalkeeper's view of the ball may be obscured by other players on the pitch who are positioned between the ball and the goalkeeper at a particular time. The goalkeeper may be identified by using any suitable method, for example using an image processing technique that identifies their jersey number and colour, using position information indicating their position relative to the pitch, or the like. In a situation where the ball is obscured from the position of the goalkeeper at a time directly before (or whilst) a player kicks the ball (for example, at a predetermined time period before the ball is kicked, e.g. 0.5 seconds, or at the point in time of contact between the player's foot and the ball when the ball is kicked), there may be a higher associated likelihood of a successful goal, since it is harder for the goalkeeper to react to the shot in time to intercept the ball's trajectory and prevent a goal.

FIG. 6 is a table 600 showing a number of parameters that are taken into account in an example of the present disclosure when training a machine learning model to estimate an overall likelihood of a goal. Use of multiple parameters in this way allows a more accurate estimation of the likelihood of a goal being scored. In this example, the parameters include the position of the CoM a player with the ball on the pitch ('Player position'), the hip-shoulder azimuthal angle of the player ('Hip-shoulder angle, az'), the hip-shoulder polar angle of the player ('Hip-shoulder angle, pol'), the backlift of the player ('Backlift'), the position of the centre of the ball on the pitch ('Ball position'), the distance between the centre of the ball and the goal ('Ball-to-goal distance'), the velocity of the ball when the ball is kicked ('Ball velocity', this being either the measured ball velocity when the ball has actually been kicked or the estimated ball velocity based on, for example, the velocity of the player's striking foot as it approaches the ball to kick it), the angle of trajectory of the ball relative to the goal when the ball is kicked ('Trajectory angle', this being either the measured angle of trajectory when the ball has actually been kicked or the estimated angle of trajectory based on, for example, the velocity of the player's striking foot and the backlift b), the goal coverage ('Goal coverage'). These may be referred to as the independent variables. The overall estimated likelihood of a goal based on the other parameters ('Likelihood of goal') and is therefore a dependent variable. Table 600 is populated with data from one or more previous sporting events, where each row of values corresponds to a particular point in time when a player is about to attempt, is attempting, or has just attempted a shot. As discussed above, a machine learning model such as a suitable regression model can be trained to associate these values with a likelihood of a goal being scored. This may be referred to as a 'shot' model (or 'expected goals' model).

In an example, data collected from, say, 50, 100 or 200 previous football games may be analysed. That is, each time a player takes a shot in each of those games, data indicating the independent variables shown in table 600 is collected. The number of goals associated with that data is also recorded to determine the 'Likelihood of goal' value for that data. Thus, for example, if there are 100 instances of data (each corresponding to a respective shot) collected which have the values of the independent variables indicated in the first row of table 600 (or within a predetermined respective ranges of those values) and, for those 100 shots, there were 31 goals and 69 misses (because the ball was blocked by a member of the opposing team or because it passed the edge 302 of the pitch without entering the goal 300), the 'likelihood of goal' value is 31%.

The position of the player and the ball are provided in a coordinate system relative to the football pitch. For example, the coordinate system may be set such that the origin is at the centre of the pitch. However, the present disclosure is not limited in this regard and in other examples the positions may be defined using any suitable coordinate system. Similarly, in other examples each of the parameters in table 600 may be provided with any suitable units of measurement and precision.

As described above, by determining pose information relating to the player at a particular time, additional parameters associated with the pose of the player such as 'Hip-shoulder angle, az', 'Hip-shoulder angle, pol' and 'Backlift' can be determined, which are each indicative of the likelihood of a goal. In addition, parameters such as the backlift and velocity of the player's striking foot can be used to predict the trajectory and velocity of the ball before the ball has been kicked. Pose information relating to other players on the pitch positioned between the ball and the goal is used to calculate the goal coverage as described above.

Figure 7:
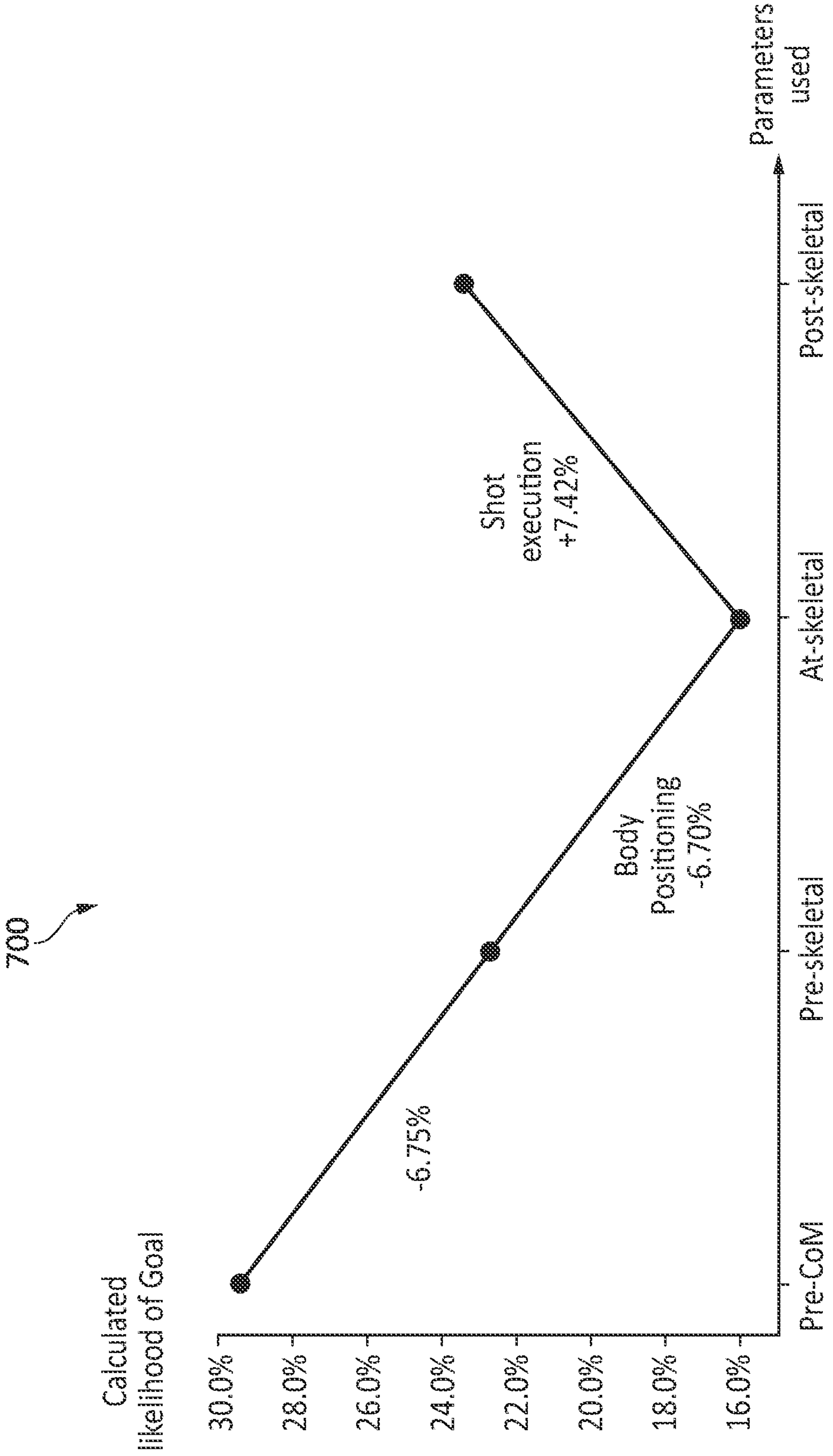
FIG. 7 is a graph 700 that demonstrates how the estimated likelihood of a goal is calculated.

By training a machine learning model to compare a number of different parameters with the overall likelihood of a goal in data from past sporting events, a greater amount of relevant information can be taken into account when estimating the likelihood of a goal from new data than in simple CoM models, for example. FIG. 7 is a graph 700 that demonstrates how the estimated likelihood of a goal is affected when more parameters are taken into account when the ball is at a particular position on the pitch. Along the y-axis is the likelihood of a goal at a particular time, and the x-axis shows how each data point is calculated using certain parameters. 'Pre-CoM' refers to the use of CoM data at a time before a player kicks the ball (e.g. a predetermined time period, such as 0.5 seconds, before contact with the ball is made by the player's foot). 'Pre-Skeletal' refers to the use of skeletal data at the time before the player kicks the ball, and includes the goal coverage from the player's position calculated using pose information relating to other players. 'At-Skeletal' refers to the use of skeletal data at a time when the player is in the process of kicking the ball (e.g. the point in time when contact between the player's foot and the ball is first made), and includes pose information relating to the player (such as their backlift and hip-shoulder angle). 'Post-Skeletal' refers to the use of data at a time immediately after the player has kicked the ball, and includes information relating to the trajectory of the ball after it has been struck (e.g. recorded position and/or velocity information of the ball starting at the time when contact between the player's foot and the ball is first made).

For example, it can be seen that the likelihood of a goal is reduced by 6.75% when the goal coverage is taken into account at a time before the player kicks the ball (compared to just taking into account the CoM data). It is further reduced by 6.70% when the player's skeletal (pose) information is taken into account at a time when the player is kicking the ball. However, based on the shot execution (e.g. as indicated by the velocity and trajectory angle of the ball once the ball has actually been kicked), the likelihood of a goal increases by 7.42%.

The likelihood of a goal at each point in graph 700 may be determined based on a suitable subset of the parameters exemplified in table 600. For example, the 'Pre-CoM' likelihood takes into account only the 'Ball position', 'Player position' and/or 'Ball-to-goal Distance' parameters. The 'Pre-skeletal' likelihood additionally takes into account the 'Goal coverage' parameter. The 'At-skeletal' likelihood additionally takes into account the 'Hip-shoulder angle, az', 'Hip-shoulder angle, pol' and 'Backlift' parameters. Finally, the 'Post-skeletal' likelihood takes into account the 'Trajectory angle' and 'Ball velocity' parameters.

Graph 700 may be indicative of the skill of a particular player in particular circumstances. For example, the greater the increase in the likelihood of a goal being scored after the execution of a shot (e.g. based on position and/or velocity information of the ball once it has been kicked, that is, 'Post-Skeletal' information) relative to the likelihood before the execution of that shot (e.g. based on the 'Pre-CoM', 'Pre-Skeletal' and 'At-Skeletal' information), may indicate the player has a greater level of skill. In the example of FIG. 7, this value is a 7.42% increase relative to 16.0% (corresponding to a first determined probability of 16.0% and a second determined probability of 23.42%, with the difference being 7.42%). A greater increase may be associated with a more highly skilled player whereas a lesser increase (or even a decrease) may be associated with a less highly skilled player. In an example, this may be useful for real time and/or post-match analysis or for coaching. For instance, the likelihood of a goal successfully being scored before and after a player takes a shot may be displayed and used to indicate a level of skill or performance of the player.

The calculated goal likelihood at a particular time (or any other generated data) can be output to an electronic display (e.g. a user device such as a smart phone, computer or the like) and used to assist in live broadcast of the sporting event, post-game analysis of player technique (e.g. to determine the probability of a player undertaking a different action resulting in a more favourable outcome), coaching (e.g. to help coach players as to the actions most likely to be successful in a given scenario) or the like. In examples of the present disclosure, when a video of a sporting event is being broadcast to an audience (or a recording of the video is being displayed to players during a coaching session), information such as that defined in FIG. 7 is used to generate graphics related to the sporting event that can be displayed alongside or overlaid on the video broadcast. For example, if video footage of the sporting event to be broadcast is received as a live feed showing the sporting event in near real-time, a delay may be introduced (e.g. a delay of 30 seconds) before the video is broadcast in order for the data and corresponding graphics to be generated. The graphics are then overlaid on the video footage and broadcast together so that the audience can experience the graphics in apparent real-time.

In addition to determining the likelihood of a goal being scored at a particular time, the above parameters can be used for calculating the likelihood of other events during a sporting event based on data from previous sporting events. One example of this is calculating the likelihood that a player who is currently controlling a ball will successfully pass it to another member of their team at a particular time.

This likelihood is indicated by the relative positions and/or velocities of the player with the ball, the ball, players on the same team and players on the opposing team, which can be indicated by a CoM model, for example. In order to identify whether another player is a potential receiver of a pass, it is necessary to classify each player by team. This can be achieved by performing any suitable type of object recognition image processing known in the art on image data received from the camera system 110 to identify aspects of each player's appearance, such as jersey number and jersey colour. By classifying players by team, it can therefore be determined whether a certain player is blocked by a member of the opposing team with respect to the position of the player with the ball, and is therefore less likely to be able to successfully receive a pass from the player with the ball.

However, when processing is performed to determine pose information relating to players as described above, the pose information can be used to calculate additional parameters that give an indication of how much control the player has over the ball. For example, pose information relating to the player can be used to determine the total time that the player has spent controlling the ball more accurately than by estimating this merely based on, for example, the relative distance between the ball and the player. Parameters such as backlift, hip-shoulder angles and the speed of the ball relative to the player's foot provide more information over how much control the player has over the ball. In addition, when identifying whether another player is blocked by members of the opposing team from receiving the ball, pose information gives a greater degree of accuracy regarding the amount of space blocked, similarly to the calculation of goal coverage described in relation to FIG. 5.

FIG. 8 is a table 800 showing a number of parameters that are taken into account in an example when training a machine learning model (e.g. a suitable regression model) to estimate an overall likelihood of a successful pass ('Likelihood of pass') at a certain time (this being the dependent variable). In this example, the independent variable parameters again include the position of a player with the ball on the pitch ('Player position'), the hip-shoulder azimuthal angle of the player ('Hip-shoulder angle, az'), the hip-shoulder polar angle of the player ('Hip-shoulder angle, pol'), and the backlift of the player ('Backlift') as in table 600. However, table 800 further includes, as independent variables, the ball position relative to the player ('Relative ball position', this being the position of the centre of the ball relative to the CoM position of the player), the minimum distance between the player and another player on the same team who is not blocked or who is blocked by less than a predetermined percentage in a plane bisecting a line between the player with the ball and the other player ('Minimum receiver distance'), the total time that the player has spent controlling the ball at that point in time ('Time with the ball', this being the time that the ball has been continuously within a predetermined distance of one of the player's feet), and the ball speed relative to one or more of the player's feet ('Relative ball speed'). As with table 600, table 800 is shown populated with data from a previous sporting event, where each row of values corresponds to a particular point in time when a player is about to attempt, is attempting, or has just attempted a pass. As discussed above, a machine learning model can be trained to associate these values with a likelihood of a pass being made. This may be referred to as a 'pass' model.

As with the shot data exemplified in table 600, in an example, data collected from, say, 50, 100 or 200 previous football games may be analysed. That is, each time a player undertakes an attempted pass in each of those games, data indicating the independent variables shown in table 800 is collected. The number of successful passes associated with that data (a successful pass being defined as when a player on the same team successfully receives and controls the ball as determined, for example, by the position of the ball falling within a predetermined distance of the receiving player and the speed of the balling falling below a predetermined value) is also recorded to determine the 'Likelihood of pass' value for that data. Thus, for example, if there are 100 instances of data (each corresponding to a respective attempted pass) collected which have the values of the independent variables indicated in the first row of table 800 (or within a predetermined respective ranges of those values) and, for those 100 shots, there were 31 successful passes and 69 unsuccessful passes, the 'likelihood of pass' value is 31%.

At any particular point in time during a football match, there are multiple possible events which could subsequently occur. Separate probabilities for the occurrence of multiple different events can therefore be calculated. For example, the likelihood of a successful pass may be calculated using a pass model in relation to a particular receiving player.

Rather than considering the 'Minimum receiver distance' as seen in FIG. 8, the model may instead take into account the distance between the player with the ball and the particular receiving player. The model may also take into account additional variables that are specific to the receiving player. For example, a value of 'player coverage' that indicates the degree by which the receiving player is obscured from the position of the player with the ball (e.g. by players on the opposing team) may be taken into account. This may be calculated in a similar manner to the 'goal coverage' described above (see e.g. FIGS. 5A and 5B, but wherein the area taken up by the receiving player (determined using pose information relating to the receiving player) is obscured by other players on the pitch rather than a goal area.

When used to calculate the likelihood of passing to a particular receiving player (that is, the likelihood of a pass for a particular 'pass option'), the model will therefore produce a different result for each possible receiving player. It can therefore be determined for which receiving players there is a higher likelihood of a successful pass at a particular time (that is, the likelihood of a successful pass for different pass options can be compared).

In some examples, the likelihood of a subsequent goal is then estimated for each potential pass option. This can be achieved by using a shot model to estimate the likelihood of a goal in the instance that a particular receiving player were to immediately make a shot after receiving the ball. Parameters such as the current position of the receiving player relative to the goal and the goal coverage from the position of the receiving player may be used to estimate the goal likelihood. The likelihood of a goal can therefore be estimated for each potential pass option. By considering both the likelihood of a pass and the likelihood of a subsequent goal for different pass options, it is possible to retroactively evaluate the performance of a player by considering whether they chose a particular pass option that had a higher likelihood of a successful pass and/or a successful subsequent goal.

For example, if the probability of successfully passing to a first player is 15% and the probability of that first player, in their current position, of scoring a goal is 22%, then the chance of a successful pass followed by a successful goal may be calculated as $0.15\times0.22=0.033=3.3\%$. On the other hand, if the probability of successfully passing to a second player is 20% and the probability of that second player, in their current position, of scoring a goal is 25%, then the chance of a successful pass followed by a successful goal may be calculated as $0.20\times0.25=0.05=5\%$. It can therefore be determined that passing to the second player is a better option than passing to the first player. This may be retroactively analysed based on recorded video footage, for example, to help enable a player to improve their passing strategy in future games.

In some examples, the overall likelihood of multiple successful passes followed by a successful goal can be calculated in the same way. For example, the likelihood of a first successful pass to a first receiving player occurring followed by a second successful pass to a second receiving player occurring and then a successful goal being scored by the second receiving player may be calculated in the same way as described above (that is, by multiplying the individual probabilities of each event, for example). This allows further improved analysis of the performance of a player in a certain situation.

In further examples, the likelihood of a goal occurring at a particular time can also be calculated based on parameters relating to each player in a team, rather than just parameters relating to the player that is controlling the ball at a particular time. For example, the positions of each player in each team on the pitch can be considered, as well as their relation to each other, the player with the ball, and the goalposts. The velocities of each member of each team can also be calculated from their position coordinates determined from images captured at successive points in time, as described above.

Figure 9:
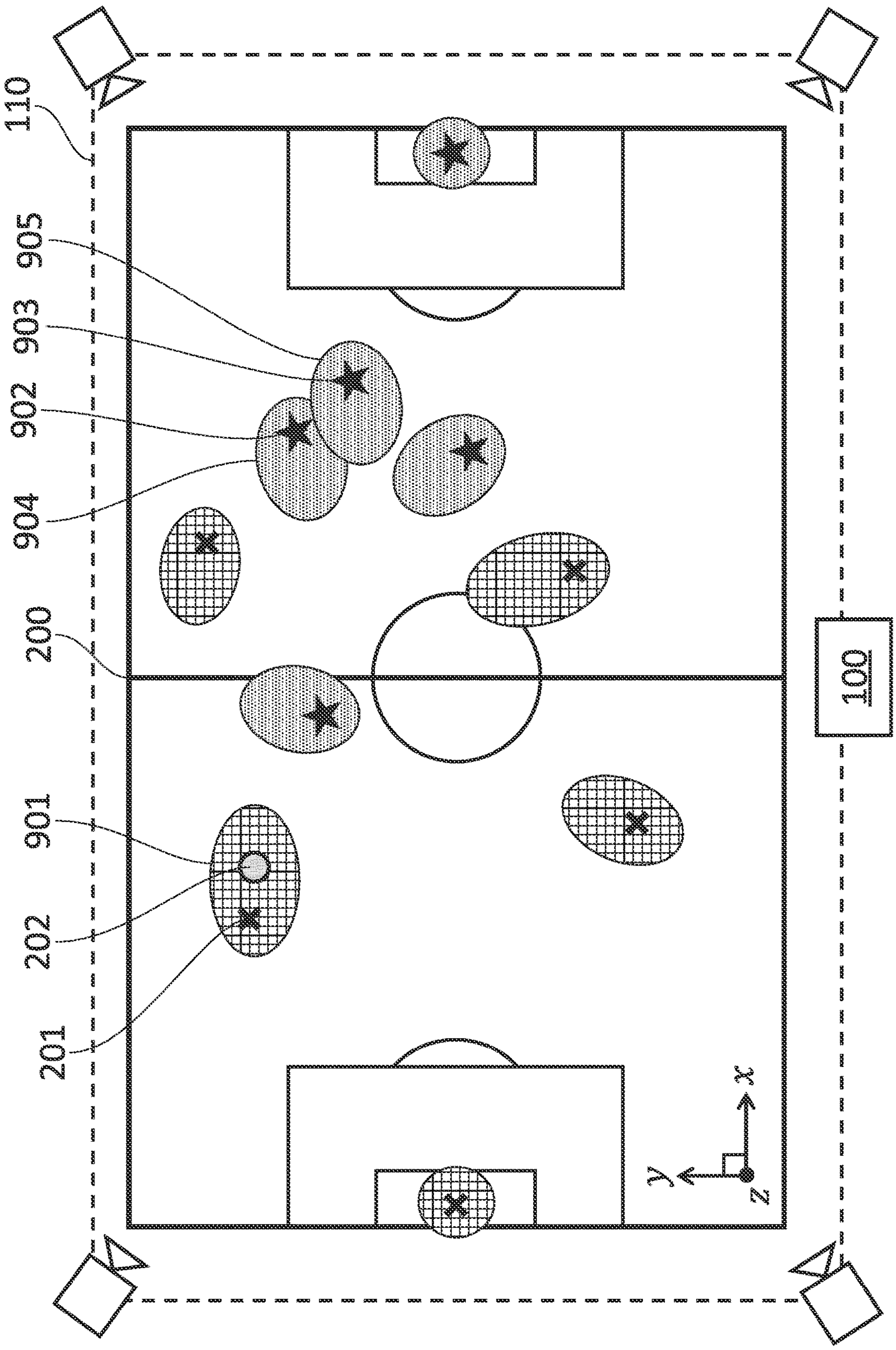
FIG. 9 depicts the football match shown in FIG. 2, where camera system 110 surrounds the football pitch 200 and player 201 is about to kick the ball 202.

FIG. 9 depicts the football match shown in FIG. 2, where camera system 110 surrounds the football pitch 200 and player 201 is about to kick the ball 202. As in FIG. 2, the ball 202 is indicated by a circle. In FIG. 9 however, the football players on the pitch 200 that are on different teams are depicted differently. Here, players that are on a first team (Team A) are indicated by a cross, whilst players that are on a second team (Team B) are indicated by a star. In addition, each player is depicted with a surrounding ellipse that defines a space around the player. Each ellipse associated with a player on Team A is shaded with horizontal stripes, whereas each ellipse associated with a player on Team B is shaded with a solid colour. For example, player 201 is on Team A and therefore indicated by a cross surrounded by an ellipse with horizontal stripes (ellipse 901), whilst players 902 and 903 are on Team B and therefore each indicated by a star surrounded by an ellipse with solid shading (ellipses 904 and 905 respectively).

Each ellipse indicates the amount of space on the pitch that the associated player controls. This includes the space directly occupied by the player and a surrounding area that the player can reach quickly (i.e. within a predetermined time period, such as 0.5, 1 or 2 seconds). The size and shape of the space can be calculated based on the position and velocity of the player, but can also be calculated more accurately by additionally using pose information for the player. For a particular team, the distribution of the spaces controlled by each member on the pitch can be used to calculate a total space controlled by the team at a particular time. When several players on the same team are clustered together in close proximity at one corner of the pitch, the team collectively does not control a large amount of space on the pitch. For example, in FIG. 9 players 902 and 903 are positioned so close to each other that their associated ellipses (that is, the amount of the space on the pitch 200 that each player controls) overlap. The total space controlled by the two players together is therefore smaller than if they were positioned further apart such that their associated ellipses did not overlap. Overall, Team B controls less space on the pitch than Team A, since the players on Team B collectively control a smaller amount of space than the players on Team A collectively control.

The relative proportion of space controlled by each team may be defined by a percentage value (herein referred to as 'possession value'), such that if two teams control the same amount of space they each have a possession value of 50%. If one team controls three times as much space on the pitch as the opposing team, the two teams will have possession values of 75% and 25% respectively.

The proportion of the pitch area controlled by a particular team can be indicative of how easy it is for them to score a goal without being blocked by members of the opposing team. In addition, the relative positions of the player with the ball and the area controlled by the opposing team is indicative of how easy it is for the player to make a successful shot or pass. As discussed above, the coverage of a particular area of the pitch (e.g. the goal area) can be calculated more accurately when the pose of the individual players is taken into account. Pose information of players on the opposing team can also be used to determine whether another player is blocked by the opposing team from receiving the ball in a pass with greater accuracy than when only position information is used.

The distribution and amount of space controlled by each team is therefore indicative of the likelihood of a successful goal by a team, and can be used to calculate the likelihood of a goal using the methods described herein. For example, given a set of player positions and/or velocities (for each player of each team) and the ball position, a given likelihood of a goal being scored over a predetermined future time period (e.g. in the next 30 seconds) may be determined based on the principles described (e.g. a machine learning model trained on suitable past player and ball position data and whether or not a goal was subsequently scored within the predetermined future time period). Further parameters, including parameters related to the pose of one of more of the players, may also be taken into account using the techniques described.

Alternatively, or in addition, the possession value may also take into account multiple paths the ball may take from the position of the player currently with the ball. For example, if a first player currently with the ball can pass to a second player who is in a position to shoot, a third player who is in a position to shoot or can take a shot themselves, each of these three scenarios may be associated with a probability (likelihood) of a goal being scored (as previously explained). By adding these probabilities together, a possession value may be determined. In an example, a possession value may take into account both the distribution and amount of space controlled by each team (as exemplified in FIG. 9) and, for instance, a predetermined number of actions (and respective associated likelihoods of a goal being scored for each of those actions). For instance, the possession value may be an appropriately weighted sum (e.g. to normalise the output) which takes into account all these factors.

For example, the possession value (expressed as a number between 0 and 1) may be expressed as:

$$P=\alpha*[\text{player distribution}]+\text{SUM}[\text{option } 1+\ldots+\text{option } n]/2$$

Thus, for example, if Team A controls three times more space on the pitch relative to Team B (e.g. as calculated using the approach exemplified in FIG. 9), then [player distribution]=0.75 (that is, 75%). Also, if n=3, then the options associated with the 3 highest likelihoods of scoring a goal for the player of Team A currently with the ball are considered. Thus, for instance, if these options are (1) to pass to a first player who then shoots (with a goal scoring likelihood of 3%), (2) to pass to a second player when then shoots (with a goal scoring likelihood of 2%) and (3) to take a shot (with a goal scoring likelihood of 1%), then option 1=0.03 (that is, 3%), option 2=0.02 (that is, 2%) and option 3=0.01 (that is, 1%). In this case:

$$P=(\alpha*0.75+[0.03+0.02+0.01])/2$$

$\alpha$ is a constant determined experimentally based on historical data, for example, to ensure P is normalised. If P doesn't need to be normalised, $\alpha$ may be set as $\alpha=1$.

Thus, in general, the possession value indicates a level of usefulness of a particular player having possession of the ball at a particular point on the pitch during a football match, taking into account the positions of all the other players and/or the likelihood(s) of a goal being scored if certain actions (e.g. shooting, passing to a first player, passing to a second player, etc.) are taken by that particular player.

Figure 10:
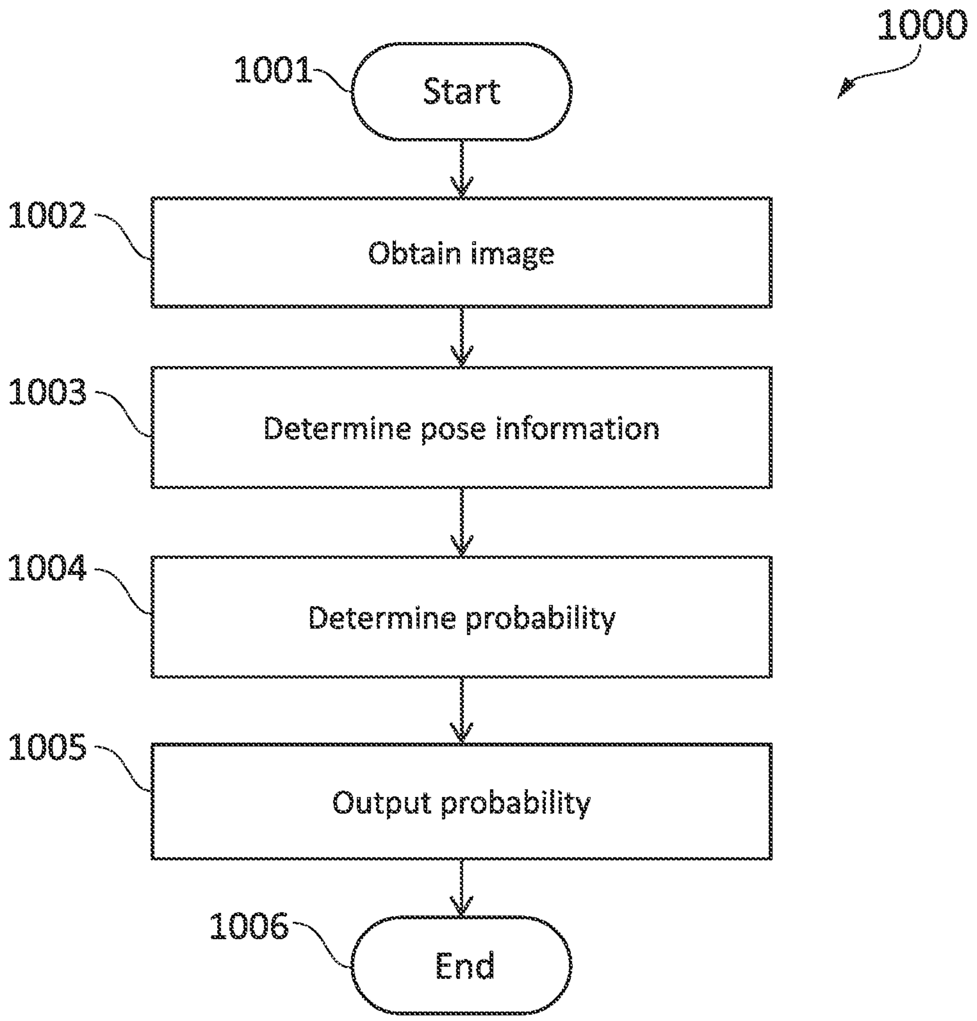
FIG. 10 is a flowchart 1000 that shows a method of estimating the likelihood of an event according to examples of the present disclosure.

FIG. 10 is a flowchart 1000 that exemplifies a method (that is, a computer-implemented method) of estimating the likelihood of an event according to examples of the present disclosure. The method may be implemented by the processor 102 of data processing apparatus 100, for example. In step 1001, the method begins. Step 1002 comprises obtaining an image of a person participating in a sport (for example, player 201 participating in a football match). Step 1003 comprises determining, using the image, pose information indicative of a pose of the person (for example, by using image processing methods to map skeleton 400 to the pose of player 201 as described with reference to FIG. 4) Step 1004 comprises determining, using historical information indicative of a relationship between the determined pose information and a probability of an occurrence of an event of the sport (for example, the training data populating table 600 in FIG. 6), a probability of the occurrence of the event of the sport (for example, the likelihood of a goal, based on a machine learning model trained using the data of table 600). In step 1005, the determined probability of the occurrence of the event of the sport is output (e.g. to an electronic display (not shown) of the data processing apparatus 100). Finally, in step 1006 the method ends.

In order for a machine learning model to be able to estimate the likelihood of a successful goal or pass in a given situation, it must be trained using meaningful data from past sporting events. In FIGS. 6 & 8 described above, tables 600 and 800 are populated with data from past sporting events at times when a player is about to kick, has just kicked, or is in the process of kicking the ball to attempt a shot or pass, respectively. The values of relevant parameters for a particular player kicking a ball to attempt a pass would not, however, be meaningful when training a model to estimate the likelihood of a goal, and vice versa. It is therefore desirable to be able to efficiently and accurately classify whether the kicking of a ball is an attempted shot or pass in order to ensure that only meaningful data is used in the methods described above. This applies to both the training data used to train the machine learning model (so 'shot' data is not used to train the 'pass' model and vice versa) and for data input to the model once it has been trained (so 'shot' data is input to the 'shot' model rather than the 'pass' model and 'pass' data is input to the 'pass' model rather than the 'shot' model). Classifying different types of shot in data from past sporting events is traditionally carried out manually, which takes a considerable amount of time and effort. The ability to automatically identify that a certain event has occurred without manual intervention is therefore advantageous. This can be achieved by analysing data from past sporting events to determine the values of certain parameters in a similar manner as described above, and training a machine learning model to associate particular values of these parameters with particular events. Any suitable machine learning model may be used, including a suitable classification model such as logistic regression, K-Nearest Neighbour (KNN) classification, Support Vector Machine (SVM) classification, Kernel SVM classification, Naïve Bayes classification, decision tree classification or random forest classification, for example.

FIG. 11 is a table 1100 showing a number of parameters that are taken into account when training a machine learning model to classify a dataset by the type of event that is occurring at that point in time, in an example of the present disclosure. Table 1100 is populated with data from a previous sporting event, where each row of values corresponds to a particular point in time when an event is either occurring or about to occur. An event may be any suitable type of event that may occur in a football match, such as a shot, a pass or the like. In this example, each event relates to the ball being kicked (with the ball being kicked generally being either a pass or a shot).

For the data in table 1100 (which is training data), the event classification will have been achieved manually (e.g. by manually labelling each event as 'shot' or 'pass', as appropriate). However, after a sufficient amount of data from past sporting events is collected and labelled, the machine learning model is trained using this labelled data so that new data can be classified automatically based on a relationship identified between the parameter values and the most likely type of classification. For example, certain values of ball-to-goal distance and goal coverage may be more strongly associated with a player attempting a goal than a pass. New data including such ball-to-goal distance and goal coverage values (or including values within predetermined respective ranges of those ball-to-goal and goal coverage values) is therefore more likely to be classified as a 'shot' than a 'pass' if the machine learning model is trained appropriately.

When processing is performed to determine pose information relating to players in the manner described above, the pose information can be used to calculate additional parameters that are indicative of a particular type of event. For example, certain values of the hip-shoulder azimuthal angle, the hip-shoulder polar angle and the backlift of a player about to kick the ball may be indicative of a particular pose that players often make when attempting a goal, and which players very rarely make when attempting to pass the ball. This scenario is shown in FIG. 12B.

Figure 12B:
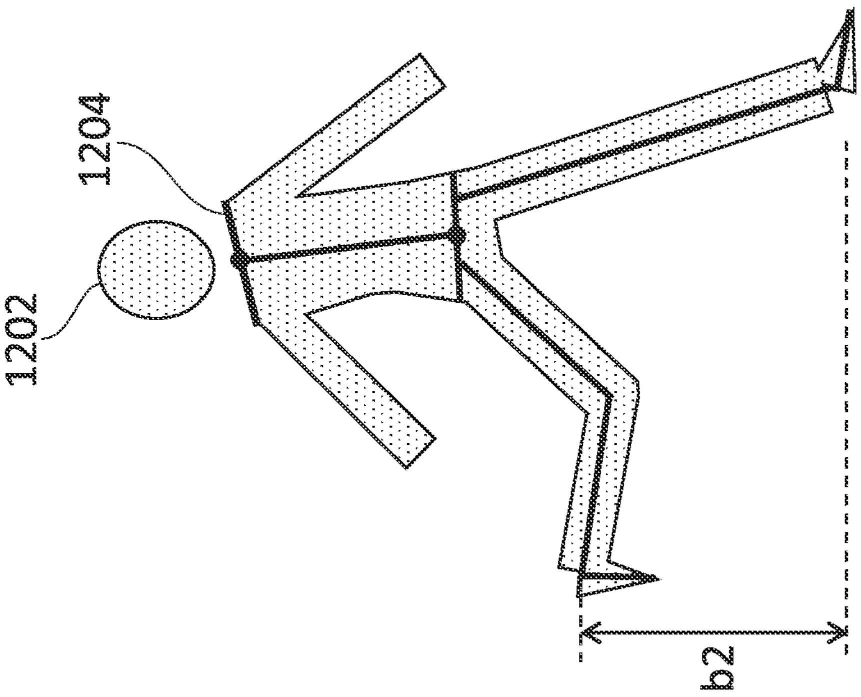
FIGS. 12A and 12B depict images captured of players 1201 and 1202 respectively.
Figure 12A:
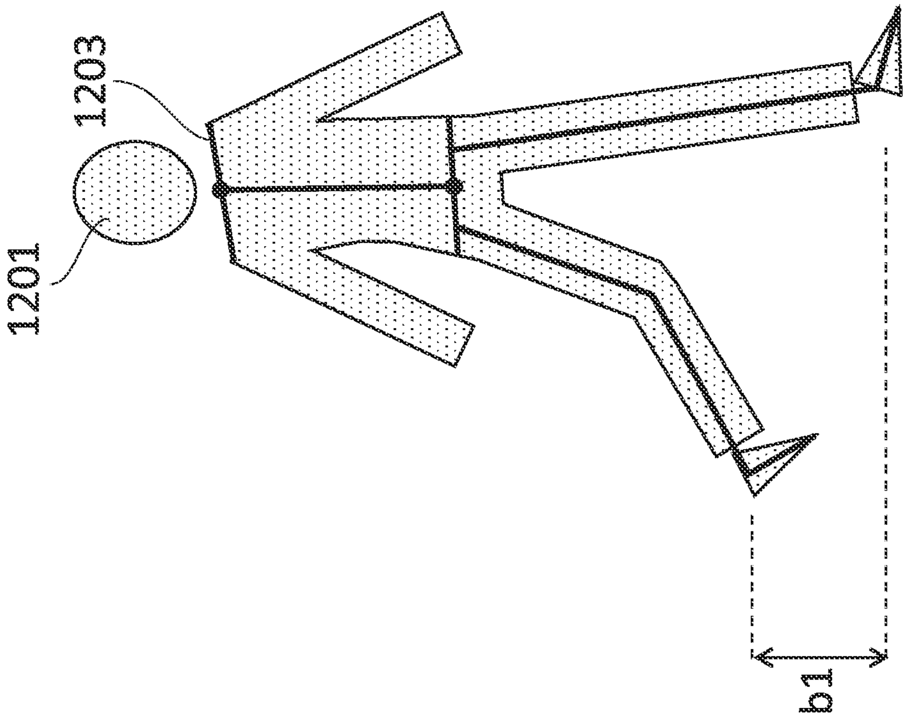

FIGS. 12A and 12B depict images captured of players 1201 and 1202 respectively. Image processing has been performed to map skeletons to each of the players 1201 and 1202 (skeletons 1203 and 1204, respectively) that indicate their pose. Each of the players 1201 and 1202 are depicted at a point in time when they are about to kick the ball. However, player 1201 is depicted at a time when they are about to pass the ball to another player, whereas player 1202 is depicted at a time when they are about to shoot. The players 1201 and 1202 have different poses as a result, as indicated by pose information determined from the skeletons 1203 and 1204. For example, player 1201 is posed such that their backlift is smaller than player 1202, as their striking foot is not raised as high as player 1202's striking foot. Player 1202 is posed such that their striking foot is raised higher in order to propel the ball across a greater distance. The pose of player 1202 is also such that their body is twisted by a greater degree, and their hip-shoulder azimuthal angle and polar angle are both greater. When data from past sporting events is considered, values of hip-shoulder azimuthal angle, hip-shoulder polar angle and backlift of a player that are identified to be similar to those in FIG. 12A (that is, within a predetermined range of those values) may be observed to be more strongly associated with instances of a player making a pass, whilst values similar to those in FIG. 12B (that is, within a predetermined range of those values) may be observed to be more strongly associated with instances of a player making a shot. By including such pose information as independent variables of the machine learning model, a more accurate classification of different types of events, such as shots and passes, may be achieved.

Pose information can be used to identify many other types of event that may occur at a sporting event, other than differentiating between a shot and a pass. By identifying events such as fouls, for example, it can be determined whether a ball is in play more quickly and accurately than if, for example, merely position information in a CoM model were considered. In an example, identifying that there has been a foul is not only based on pose information relating to the players and the ball, but also pose information relating to a person who is not a player. This is exemplified in from FIG. 13.

Figure 13:
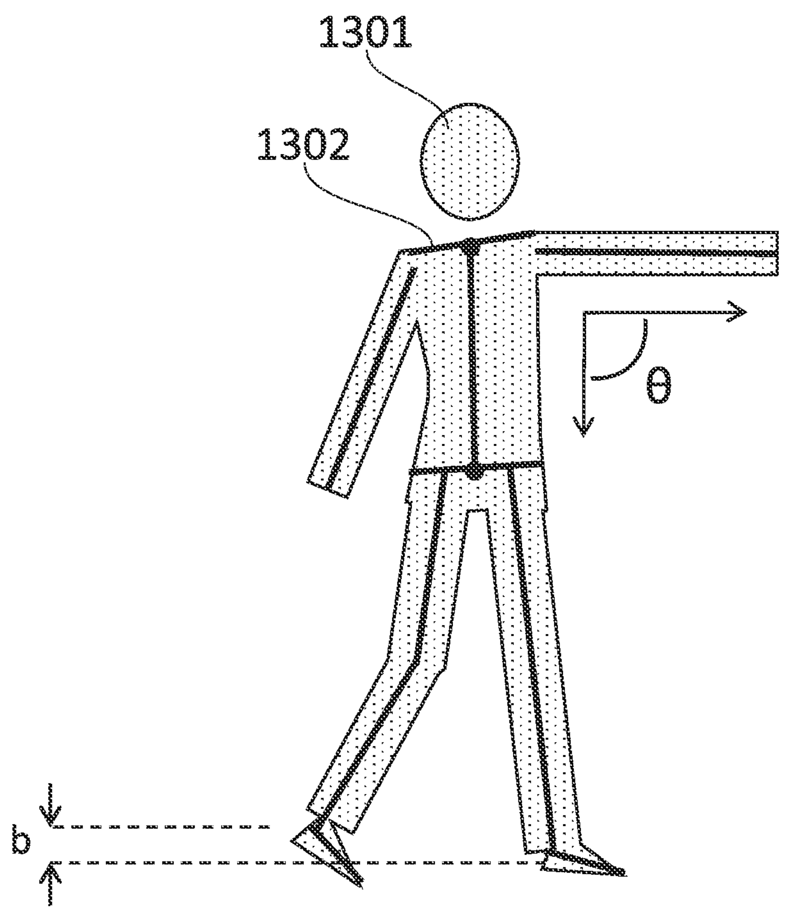
FIG. 13 depicts a person 1301 with a pose indicative that a foul has occurred.

FIG. 13 depicts a person 1301 who is a match official of the football match (for example, a referee or assistant referee) and who has a pose indicative that a foul has occurred. The person 1301 is determined to be a match official using any suitable method, for example using an image processing technique that identifies their clothing to match the clothing of a match official, using position information indicating their position relative to the pitch, or the like. From the skeleton 1302 mapped to the person 1301 it can be determined that the person 1301 has raised their arm to point or otherwise gesture in a particular direction, from the angle of their arm, θ (relative to the vertical, in this case, relative to the −z axis direction). Other parameters such as their backlift and hip-shoulder angles indicate that they are walking rather than running, and not about to kick the ball. In an example such as this, pose information relating to certain players on the pitch corresponding to the same point in time may indicate that a player has been knocked to the ground and has remained on the ground for an extended period (e.g. more than a predetermined time period, such as more than 1, 2, 3 or 5 seconds). Thus, it can be determined there has been a foul because (1) a match official (e.g. referee) has raised their arm in a pointing motion (e.g. so θ is greater than a predetermined angle, e.g. greater than 45°) and (2) within a predetermined time period (e.g. 1, 2, 3 or 5 seconds) preceding and/or following the time that the match official's arm is first raised, a player is lying on the ground (and, optionally, remains on the ground for more than a predetermined time period). By taking into account pose information it can therefore be determined that a foul has occurred more accurately than if the determination was based purely on the positions and/or velocities of the players. Again, a suitably trained machine learning model (such as a suitable classification model) may be trained to classify events based on one or more independent variables (e.g. parameters related to pose) associated with objects (players, non-players, the ball, etc.) in this way.

A number of different events which may be identified using pose information have been described. However, the present disclosure is not limited in this regard and in further examples pose information may be used to identify any suitable event that occurs at the sporting event. For example, if a player intercepts a pass between players on the opposing team, pose information relating to the intercepting player may indicate that they are stretching to reach the ball to a greater degree than if they were receiving a pass from a member of their own team or taking a shot. In further examples, if a player is about to take a free kick, pose information may be used to identify that they have picked the ball up and are carrying it in their hands. When there is a throw in, pose information relating to the player with the ball may indicate that they are raising their arms above their head to perform the throw. If an offside offense occurs, pose information relating to a person identified to be an assistant referee can be used to identify that the person has raised their arm by a certain angle when signalling with a flag that the offense has occurred.

Overall, the progression of the match can thus be tracked more accurately by identifying both events such as fouls occurring and the individual actions of players using pose information. If a player jumped, for example, the jumping action could be identified from their pose information with a higher degree of confidence than if it were guessed that a jump has occurred based only on a change in the player's position in the z-direction.

A player may favour using a particular foot, their left foot or their right foot, to kick the ball. A player that favours their right foot will have a greater degree of control over the ball when kicking it with their right foot than when kicking it with their left foot, and vice versa. Whenever a player touches the ball, pose information relating to the player can identify whether the ball was touched by the player's left foot or their right foot, which can therefore be taken into account when calculating the degree of control the player has over the speed and direction of the ball at a particular time. It may be predetermined that a particular player (identifiable by their jersey colour and number, as described above) favours a particular foot. However, in some examples pose information relating to a player can be used to identify whether the player favours a particular foot. For example, if a player uses their right foot to kick the ball more frequently than their left foot during a match, it can be identified that they favour using their right foot. Pose information can further indicate which side of the foot (for example, the inward-facing edge or the outward-facing edge) touched the ball. This provides even further information indicating the degree of control the player has over the ball, as well as the predicted trajectory of the ball. This information can be taking into account by the machine learning model accordingly.

Thus, pose information can be used to determine relevant parameters that indicative of certain events occurring in a sporting event with greater accuracy with the present technique.

Figure 14:
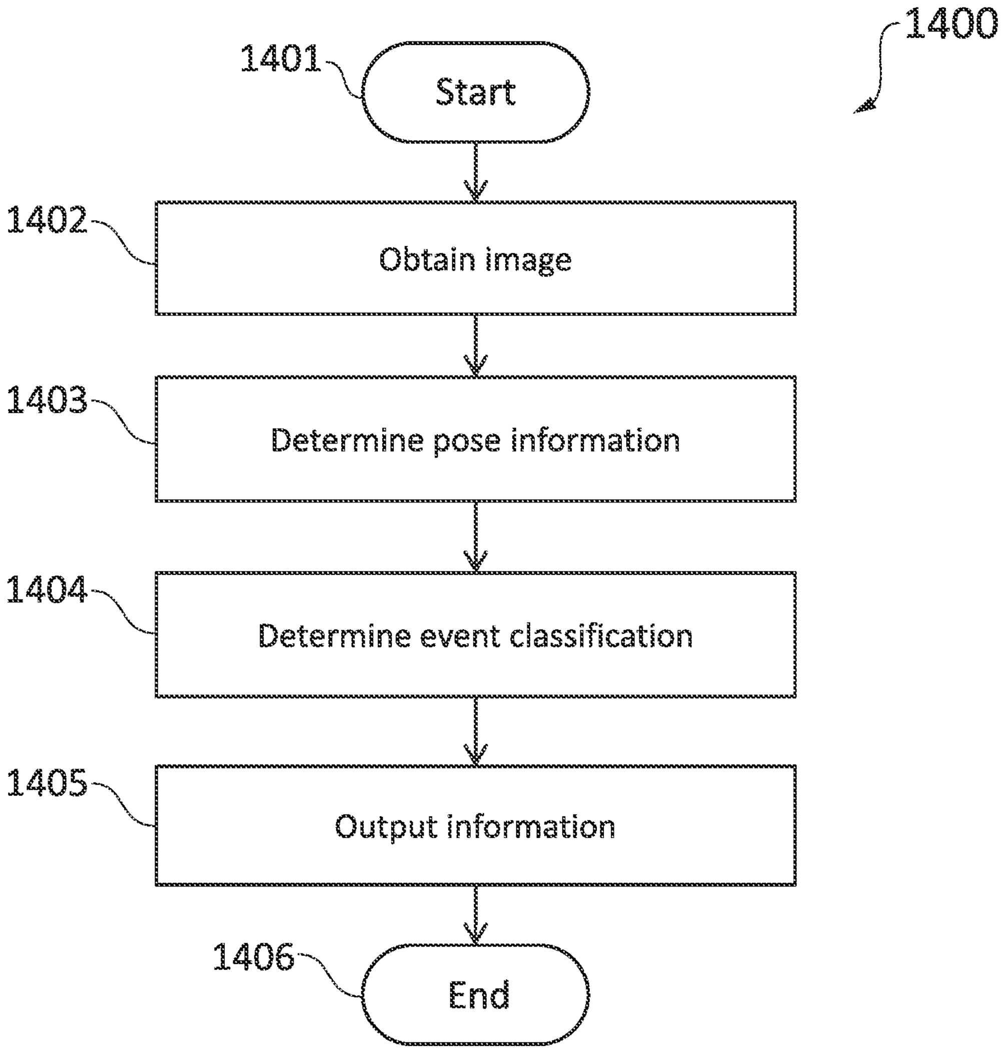
FIG. 14 is a flowchart 1400 that shows a method of estimating the likelihood of an event according to examples of the present disclosure.

FIG. 14 is a flowchart 1400 that exemplifies a method (that is, a computer-implemented method) of classifying an event according to examples of the present disclosure. The method may be implemented by the processor 102 of data processing apparatus 100, for example. In step 1401, the method begins. Step 1402 comprises obtaining an image of a person participating in a sport (for example, player 1201 participating in a football match). Step 1403 comprises determining, using the image, pose information indicative of a pose of the person (for example, by using image processing methods to map skeleton 1203 to the pose of player 1201 as described with reference to FIG. 12). Step 1404 comprises determining, using historical information indicative of a relationship between the determined pose information and one or more predetermined event classifications of events of the sport (for example, the data populating table 800 in FIG. 8), an event classification of an event at a capture time of the obtained image (for example, the classification of the event being a 'shot' or 'pass', based on a machine learning mode trained using the data of table 800). In step 1405, information indicative of the determined event classification is output. For example, when it is determined a kick of a ball is a 'shot', the detected parameters associated with the 'shot' (e.g. player position, hip-shoulder angle az, hip-shoulder angle pol, etc.) are input to a 'shot' machine learning model. Alternatively, when it is determined a kick of the ball is a 'pass', the detected parameters associated with the 'pass' are input to a 'pass' machine learning model. Finally, in step 1406 the method ends.

Example(s) of the present technique are defined by the following numbered clauses:

1. A data processing apparatus comprising circuitry configured to:
   - obtain an image of a person participating in a sport;
   - determine, using the image, pose information indicative of a pose of the person;
   - determine, using historical information indicative of a relationship between the determined pose information and a probability of an occurrence of an event of the sport, a probability of the occurrence of the event of the sport; and
   - output the determined probability of the occurrence of the event of the sport.

2. A data processing apparatus according to any preceding clause, wherein the pose information comprises an angle between a direction of the person's hips and a direction of the person's shoulders.

3. A data processing apparatus according to any preceding clause, wherein the pose information comprises a maximum height above the ground of an ankle of the person.

4. A data processing apparatus according to any preceding clause, wherein the person is a player of the sport.

5. A data processing apparatus according to any preceding clause, wherein the sport is a football match.

6. A data processing apparatus according to clause 5, comprising:
   - determining, using the pose information, an amount by which a goal area is obscured from a position on a football pitch; and
   - determining the probability of the occurrence of the event of the sport using the determined proportion of the goal area.

7. A data processing apparatus according to clause 5 or 6, wherein the event is a goal being scored.

8. A data processing apparatus according to clause 5 or 6, wherein the event is a successful pass from the person to another person participating in the football match.

9. A data processing apparatus according to clause 5 or 6, wherein the event comprises one or more successful passes between the person and one or more other persons participating in the football match followed by the scoring of a goal.

10. A data processing apparatus according to any one of clauses 5 to 9, wherein the circuitry is configured to determine a possession value based on a position of each of one or more persons participating in the football match and/or the determined probability of the occurrence of the event of the sport.

11. A data processing apparatus according to any one of clauses 7 to 9, wherein the determined probability of the occurrence of the event of the sport is a first determined probability, and the circuitry is configured to:
   - determine, based on a trajectory of a ball struck by the person, a second probability of the occurrence of the event of the sport; and
   - output information indicative of a difference between the first and second determined probabilities.

12. A data processing method comprising:
   - obtaining an image of a person participating in a sport;
   - determining, using the image, pose information indicative of a pose of the person;
   - determining, using historical information indicative of a relationship between the determined pose information and a probability of an occurrence of an event of the sport, a probability of the occurrence of the event of the sport; and
   - outputting the determined probability of the occurrence of the event of the sport.

13. A data processing method according to clause 12, wherein the pose information comprises an angle between a direction of the person's hips and a direction of the person's shoulders.

14. A data processing method according to clause 12 or 13, wherein the pose information comprises a maximum height above the ground of an ankle of the person.

15. A data processing method according to any one of clauses 12 to 14, wherein the person is a player of the sport.

16. A data processing method according to any one of clauses 12 to 15, wherein the sport is a football match.

17. A data processing method according to clause 16, comprising:

determining, using the pose information, an amount by which a goal area is obscured from a position on a football pitch; and determining the probability of the occurrence of the event of the sport using the determined proportion of the goal area.

18. A data processing method according to clause 16 or 17, wherein the event is a goal being scored.

19. A program for controlling a computer to perform a method according to any one of clauses 12 to 18.

20. A storage medium storing a program according to clause 19.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

What is claimed is:

1. A data processing apparatus comprising circuitry configured to:

obtain an image of a person participating in a sport;

determine, using the image, pose information indicative of a pose of the person;

determine a classification of an event of the sport based on the pose information determined, wherein the event of the sport is one of a scoring of a point in the sport or a pass to another person;

determine, using a model selected from a set of models based on the classification of the event of the sport, a probability of the occurrence of the event of the sport; and output the determined probability of the occurrence of the event of the sport, wherein the model is trained using historical information associated with the classification and indicative of a relationship between pose information and a probability of an occurrence of the event of the sport.

2. A data processing apparatus according to claim 1, wherein the pose information comprises an angle between a direction of the person's hips and a direction of the person's shoulders.

3. A data processing apparatus according to claim 1, wherein the pose information comprises a maximum height above the ground of an ankle of the person.

4. A data processing apparatus according to claim 1, wherein the person is a player of the sport.

5. A data processing apparatus according to claim 1, wherein the sport is a football match.

6. A data processing apparatus according to claim 5, comprising:

determining, using the pose information, an amount by which a goal area is obscured when viewed from a position on a football pitch of the person; and determining the probability of the occurrence of the event of the sport using the determined proportion of the goal area.

7. A data processing apparatus according to claim 5, wherein the point is a goal.

8. A data processing apparatus according to claim 5, wherein the event is a successful pass from the person to another person participating in the football match.

9. A data processing apparatus according to claim 5, wherein the event comprises one or more successful passes between the person and one or more other persons participating in the football match followed by the scoring of a goal.

10. A data processing apparatus according to claim 5, wherein the circuitry is configured to determine a possession value based on a position of each of one or more persons participating in the football match and/or the determined probability of the occurrence of the event of the sport.

11. A data processing apparatus according to claim 7, wherein the determined probability of the occurrence of the event of the sport is a first determined probability, and the circuitry is configured to:

determine, based on a trajectory of a ball struck by the person, a second probability of the occurrence of the event of the sport; and output information indicative of a difference between the first and second determined probabilities.

12. A data processing method comprising:
obtaining an image of a person participating in a sport;
determining, using the image, pose information indicative of a pose of the person;
determining a classification of an event of the sport based on the pose information determined, wherein the event of the sport is one of a scoring of a point in the sport or a pass to another person;
determining, using a model selected from a set of models based on the classification of the event of the sport, a probability of the occurrence of the event of the sport; and
outputting the determined probability of the occurrence of the event of the sport, wherein the model is trained using historical information associated with the classification and indicative of a relationship between pose information and a probability of an occurrence of the event of the sport.

13. A data processing method according to claim 12, wherein the pose information comprises an angle between a direction of the person's hips and a direction of the person's shoulders.

14. A data processing method according to claim 12, wherein the pose information comprises a maximum height above the ground of an ankle of the person.

15. A data processing method according to claim 12, wherein the person is a player of the sport.

16. A data processing method according to claim 12, wherein the sport is a football match.

17. A data processing method according to claim 16, comprising:
determining, using the pose information, an amount by which a goal area is obscured when viewed from a position on a football pitch of the person; and
determining the probability of the occurrence of the event of the sport using the determined proportion of the goal area.

18. A data processing method according to claim 16, wherein the point is a goal.

19. A storage medium storing computer-executable instructions for a program for controlling a computer to perform the method according to claim 12.

* * * * *